United States Patent
Hirahara et al.

(10) Patent No.: US 12,410,524 B2
(45) Date of Patent: Sep. 9, 2025

(54) METHOD FOR MANUFACTURING LAMINATE

(71) Applicant: NATIONAL UNIVERSITY CORPORATION, IWATE UNIVERSITY, Iwate (JP)

(72) Inventors: Hidetoshi Hirahara, Iwate (JP); Jing Sang, Iwate (JP); Sumio Aisawa, Iwate (JP)

(73) Assignee: National University Corporation, Iwate University, Iwate (JP)

(*) Notice: Subject to any disclaimer, the term of this patent is extended or adjusted under 35 U.S.C. 154(b) by 0 days.

(21) Appl. No.: 18/689,762

(22) PCT Filed: Dec. 21, 2022

(86) PCT No.: PCT/JP2022/047121
§ 371 (c)(1),
(2) Date: Mar. 6, 2024

(87) PCT Pub. No.: WO2023/120579
PCT Pub. Date: Jun. 29, 2023

(65) Prior Publication Data
US 2024/0279813 A1    Aug. 22, 2024

(30) Foreign Application Priority Data

Dec. 24, 2021 (JP) .................. 2021-211072

(51) Int. Cl.
C23C 18/20    (2006.01)
C23C 18/16    (2006.01)
(Continued)

(52) U.S. Cl.
CPC ...... *C23C 18/1653* (2013.01); *C23C 18/1641* (2013.01); *C23C 18/38* (2013.01);
(Continued)

(58) Field of Classification Search
CPC ..... C23C 18/20; C23C 28/00; C23C 18/1653; C23C 18/2006; C25D 5/56
(Continued)

(56) References Cited

U.S. PATENT DOCUMENTS

2013/0183534 A1* 7/2013 Mori .................. C25D 5/56
427/98.5
2014/0371367 A1   12/2014 Nishimura et al.
2015/0152124 A1*  6/2015 Mori .................. C07F 7/1804
428/457

FOREIGN PATENT DOCUMENTS

| CN | 110753617 A | 2/2020 |
| CN | 111050929 A | 4/2020 |

(Continued)

OTHER PUBLICATIONS

Chen et al., "Adsorption Behaviors of Deposition-Targeted Metallic Ions onto Thiol-Containing Silane Modified Liquid Crystal Polymer Surfaces," Applied Surface Science (Jun. 15, 2019), vol. 479, pp. 368-374. (Year: 2019).*

(Continued)

*Primary Examiner* — Edna Wong
(74) *Attorney, Agent, or Firm* — Meunier Carlin & Curfman LLC

(57) ABSTRACT

A method for manufacturing a laminate is a method for manufacturing a laminate including a resin substrate, and a metal layer provided on the resin substrate, the method including: a base layer forming step of forming a base layer with a base triazine-based silane coupling agent which is represented by the following Formula (1) directly or via another layer, on a surface of the resin substrate on which the metal layer is formed; and a molecular bonding layer forming step of forming a molecular bonding layer with a
(Continued)

catalytic triazine-based silane coupling agent represented by the following Formula (2), on a surface of the base layer.

11 Claims, 1 Drawing Sheet

(51) Int. Cl.
*C23C 18/38* (2006.01)
*C23C 28/00* (2006.01)
*C23C 28/02* (2006.01)
*C25D 3/38* (2006.01)
*C25D 5/56* (2006.01)

(52) U.S. Cl.
CPC .............. *C23C 28/023* (2013.01); *C25D 3/38* (2013.01); *C25D 5/56* (2013.01)

(58) Field of Classification Search
USPC ..... 205/167, 164; 427/306, 412.1, 535, 536, 427/537
See application file for complete search history.

(56) References Cited

FOREIGN PATENT DOCUMENTS

| | | | | |
|---|---|---|---|---|
| JP | 2007017921 A | * | 1/2007 | ................ C08J 7/12 |
| JP | 2010280813 A | | 12/2010 | |
| JP | 2015104913 A | * | 6/2015 | ............. B32B 15/08 |
| JP | 2020088123 A | | 6/2020 | |
| JP | 7336170 B1 | | 8/2023 | |
| KR | 10-2018-0110597 A | | 10/2018 | |
| WO | 2012046651 A1 | | 4/2012 | |
| WO | 2013094663 A1 | | 6/2013 | |
| WO | 2013186941 A1 | | 12/2013 | |
| WO | WO-2018181518 A1 | * | 10/2018 | ............. B32B 27/00 |

OTHER PUBLICATIONS

Chen et al., "Interfacial Nanoconnections and Enhanced Mechanistic Studies of Metallic Coatings for Molecular Gluing on Polymer Surfaces," Nanoscale Advances (2020), vol. 2, No. 5, pp. 2106-2113. (Year: 2020).*
Hirahara et al., "Copper Plating on Corona Treated Fluororubber Surfaces Using a Molecular Adhesive Technology," J. Jpn. Soc. Colour Mater. (2013), Volo. 86, No. 9, pp. 321-324. (Year: 2013).*
Abe et al., "ABS Resin Plating of Sexivalent Chrome Etching-Free," Kobunshi Ronbunshu (Apr. 2008), vol. 65, No. 4, pp. 283-287. ( Year: 2008).*
International Search Report in Application No. PCT/JP2022/047121, mailed Mar. 20, 2023, 4 pages.
Decision to Grant in Application No. 2023-520154, dated Jan. 21, 2023, 7 pages.
Office Action issued on Jun. 14, 2024, in Chinese Patent Application No. 202280060970.3.
Office Action issued for Korean Application No. 10-2024-7007967, dated Apr. 4, 2024.

* cited by examiner

METHOD FOR MANUFACTURING LAMINATE

TECHNICAL FIELD

The present invention relates to a method for manufacturing a laminate.

This application is a U.S. National Phase Application of International patent application number PCT/JP2022/047121 filed on Dec. 21, 2022, which claims the benefit of Japanese Patent Application No. 2021-211072, filed Dec. 24, 2021, the content of both of which are incorporated herein by reference in their entirety.

BACKGROUND ART

Flexible circuit boards are used for electronic products such as mobile phones. This flexible circuit board is required to reduce a transmission loss in a high frequency range along with miniaturization, high performance, and high-speed communication of electronic products, and wiring to a smooth surface and high definition circuits for reducing conductor loss, which is one of factors of the transmission loss, are being promoted.

As the flexible circuit board, a laminate of a polyimide resin having excellent flexibility and heat resistance and a copper foil or copper plating having high conductivity is often used. As a laminate of a polyimide resin and a copper foil, there are a laminate material in which a copper foil and a polyimide resin are thermocompression-bonded via a thermoplastic polyimide resin, and a cast material in which a varnish of a polyimide resin precursor is applied onto the copper foil and thermally cured. In the laminate made with copper plating, electroless plating is performed on the surface of the polyimide resin, and then electrolytic plating is performed.

However, the laminate material and the cast material are low in cost, but the copper foil is roughened in order to ensure adhesion between copper and the resin substrate. Therefore, it is difficult to use the laminate material and the cast material for a high frequency circuit. When copper plating is performed, the surface of the polyimide resin on the copper plating side is roughened by etching or the like. In this case, it is also difficult to use the laminate material and the cast material for a high frequency circuit.

As a flexible circuit board in which the surface of a copper foil is not roughened, Patent Document 1 discloses a flexible circuit board manufactured by supporting a catalyst on a molecular bonding agent on the surface of a resin substrate and then performing electroless copper plating and electric copper plating.

As a flexible circuit board in which a surface of a copper foil is not roughened, Patent Document 2 discloses a flexible circuit board in which an adhesion strength improving layer containing chromium, a copper diffusion barrier layer containing nickel or molybdenum, and a conductive layer made of copper or a copper alloy are formed on a surface of one surface or both surfaces of a resin film containing a polyimide resin.

Patent Document 3 discloses that electroless plating can be performed by attaching an amino group-containing alkoxysilane compound to the surface of a solid material without generating a hydroxyl group in a resin layer and heating the resultant, and then attaching a triazine thiol derivative to the resultant and heating the resultant.

CITATION LIST

Patent Document

[Patent Document 1]
 Japanese Unexamined Patent Application, First Publication No. 2007-17921
[Patent Document 2]
 Japanese Unexamined Patent Application, First Publication No. 2020-88123
[Patent Document 3]
 Japanese Unexamined Patent Application, First Publication No. 2010-280813

SUMMARY OF INVENTION

Technical Problem

However, the flexible circuit board disclosed in Patent Document 1 is required to improve adhesion between a metal layer and a resin in a high-temperature and high-humidity environment. In addition, in the case of the flexible substrate disclosed in Patent Document 2, there is a problem that the cost for forming the adhesion strength improving layer and the copper diffusion barrier layer is high. Patent Document 3 discloses that electroless plating can be performed by attaching an amino group-containing alkoxysilane compound to the surface of a solid material without generating a hydroxyl group in a resin layer and heating the resultant, and then attaching a triazine thiol derivative to the resultant and heating the resultant. However, currently, higher adhesion between the resin and the metal in a high-temperature and high-humidity environment than the method of Patent Document 3 is required.

The present invention has been made in view of the above problems, and an object of the present invention is to provide a method for manufacturing a laminate of which a surface of a metal layer on a side which is in contact with a resin is smooth, adhesion between the metal layer and the resin in a high-temperature and high-humidity environment is excellent, and cost is low.

Solution to Problem

In order to solve the above problems, the present invention proposes the following means.

<1> According to one aspect of the present invention, there is provided a method for manufacturing a laminate is a method for manufacturing a laminate including a resin substrate, and a metal layer provided on the resin substrate, the method including:

a base layer forming step of forming a base layer with a base triazine-based silane coupling agent which is represented by the following Formula (1) directly or via another layer, on a surface of the resin substrate on which the metal layer is formed; and a molecular bonding layer forming step of forming a molecular bonding layer with a catalytic triazine-based silane coupling agent represented by the following Formula (2), on a surface of the base layer.

[Chemical Formula 1]

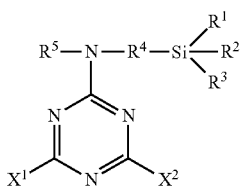

[Chemical Formula 2]

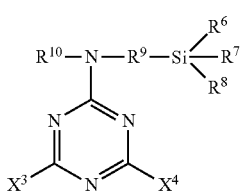

In Formula (1), $X^1$ and $X^2$ are any one of a 2-aminoethylamino group, an amino group, and an azide group, $X^1$ and $X^2$ may be the same or different, $R^1$, $R^2$, and $R^3$ represent a hydrogen atom or an alkoxy group, $R^1$, $R^2$, and $R^3$ may be the same or different, $R^4$ represents an alkylene group, and $R^5$ represents a hydrogen atom, an alkyl group, or an alkoxy group. In Formula (2), $X^3$ and $X^4$ are a thiol group or a thiol metal salt, $X^3$ and $X^4$ may be the same or different, $R^6$, $R^7$, and $R^8$ represent a hydrogen atom or an alkoxy group, $R^6$, $R^7$, and $R^8$ may be the same or different, $R^9$ represents an alkylene group, and $R^{10}$ represents a hydrogen atom, an alkyl group, or an alkoxy group.

<2> In the method for manufacturing a laminate according to the <1>, a surface treatment step of introducing an oxygen-containing functional group or a nitrogen-containing functional group into the surface of the resin substrate may be provided.

<3> In the method for manufacturing a laminate according to the <2>, the surface treatment step may include a hydroxyl group modifying step of introducing a hydroxyl group as an oxygen-containing functional group into the surface of the resin substrate.

<4> In the method for manufacturing a laminate according to the <3>, the hydroxyl group modifying step may be a corona treatment or oxygen gas introduction plasma.

<5> In the method for manufacturing a laminate according to the <2>, the surface treatment step may include an amino group modifying step of introducing an amino group as a nitrogen-containing functional group into the surface of the resin substrate.

<6> In the method for manufacturing a laminate according to the <5>, the amino group modifying step may be a plasma treatment.

<7> In the method for manufacturing a laminate according to any one of the <1> to <6>, the resin composing the resin substrate may be one selected from the group consisting of an epoxy resin, a polyimide resin, polyphenylenesulfide, polytetrafluoroethylene, silicon rubber, a cyclic olefin copolymer, polystyrene, and a liquid crystal polymer.

<8> In the method for manufacturing a laminate according to any one of the <1> to <7>, a catalyst supporting step of supporting a catalyst on a surface of the molecular bonding layer may further be provided.

<9> In the method for manufacturing a laminate according to the <8>, an electroless plating step of forming a metal layer on a surface of the molecular bonding layer supporting the catalyst by electroless plating may further be provided.

<10> In the method for manufacturing a laminate according to the <9>, an electroplating step of thickening the metal layer by performing electroplating on the metal layer formed in the electroless plating step may further be provided.

Advantageous Effects of Invention

According to the above aspect of the present invention, it is an object to provide a method for manufacturing a laminate of which the surface of the metal layer on the side in contact with the resin is smooth, the adhesion between the metal layer and the resin in a high-temperature and high-humidity environment is excellent, and the cost is low.

DESCRIPTION OF EMBODIMENTS

<Laminate>

Examples of the cause of the decrease in adhesion between the metal layer and the resin substrate in a high-temperature and high-humidity environment include diffusion of a metal element forming the metal layer, for example, copper, into the resin substrate to decompose the resin, and formation of an oxide of the metal layer at an interface between the metal layer and the resin substrate to cause peeling (blister) between the metal layer and the oxide of the metal layer. Another reason for the decrease in adhesion between the metal layer and the resin substrate in a high-temperature and high-humidity environment is that the barrier layer composed of an alkyl-based aminosilane coupling agent is broken by hydrolysis, thereby decreasing the barrier performance.

Therefore, the present inventors have intensively studied a method capable of suppressing diffusion of a metal element in a metal layer to a resin substrate in a high-temperature and high-humidity environment and generation of a metal oxide formed at an interface between the metal layer and the resin substrate at low cost. As a result, the present inventors found that adhesion between a metal layer and a resin in a high-temperature and high-humidity environment can be improved at low cost by forming an intermediate layer (base layer) composed of a triazine-based silane coupling agent between the metal layer and the resin substrate and then forming a molecular bonding layer with a triazine-based silane coupling agent capable of supporting a catalyst. In the present invention, each constituent requirement of the laminate was determined based on the above findings.

Figure 1:
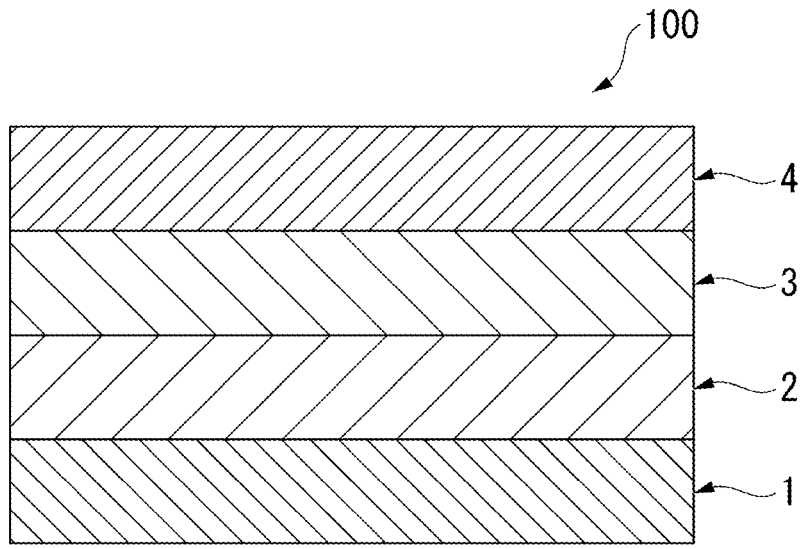
FIG. 1 is a schematic cross-sectional view of a laminate according to an embodiment of the present invention.

Hereinafter, a laminate according to an embodiment of the present invention will be described with reference to the drawings. As shown in FIG. 1, a laminate 100 according to an embodiment of the present invention includes a resin substrate 1, a base layer 2, a molecular bonding layer 3, and a metal layer 4. Each unit will be described below.

(Resin Substrate)

The resin of the resin substrate 1 is not particularly limited. The resin composing the resin substrate 1 is one or more selected from the group consisting of an epoxy resin, a polyimide resin (PI), polyphenylenesulfide (PPS), polytetrafluoroethylene (PTFE), silicon rubber, a cyclic olefin copolymer (COP), polystyrene (PS), and a liquid crystal polymer (LCP). These resins may be used alone, or may be a copolymer, a mixture, or a laminate.

When the laminate 100 is used as a printed circuit board, a thermal load is applied to the laminate 100 in soldering of wiring or the like. In addition, when the laminate 100 is used for a movable part of an electronic product, sufficient mechanical strength is required. Therefore, a polyimide resin, an epoxy resin, a liquid crystal polymer, or the like having excellent properties in terms of heat resistance, mechanical strength, and dimensional stability is preferable.

The resin of the resin substrate 1 may contain inorganic particles such as talc, a lubricant, an antistatic agent, and the like according to the purpose of improving mechanical strength and the like.

The thickness of the resin substrate 1 is not particularly limited, but for example, when the resin substrate 1 is used for a flexible circuit board, the thickness of the resin substrate 1 is preferably 1 µm or more and 200 µm or less. When the thickness of the resin substrate 1 is less than 1 µm, the mechanical strength of the resin substrate 1 may be insufficient, which is not preferable. The thickness of the resin substrate 1 is more preferably 3 µm or more. When the thickness of the film exceeds 200 µm, the bendability may be deteriorated, which is not preferable. The thickness of the resin substrate 1 is more preferably 150 µm or less.

The arithmetic average roughness Ra of the resin substrate 1 is, for example, 0.01 to 1 µm. When the arithmetic average roughness Ra is between 0.01 µm and 1 µm, it is possible to cope with circuit miniaturization. When the arithmetic average roughness Ra is 0.2 µm or less, the transmission loss in the high frequency range can be reduced. The arithmetic average roughness Ra can be measured according to JIS B 0601:2013.

(Base Layer 2)

The base layer 2 is provided on the resin substrate 1 and contains a reactant of a base triazine-based silane coupling agent. Here, "provided on the resin substrate 1" includes not only providing the base layer 2 to be in contact with the surface of the resin substrate 1 but also providing an intermediate layer between the resin substrate 1 and the base layer 2. The reactant of the base triazine-based silane coupling agent is a compound formed by the reaction of the base triazine-based silane coupling agent. The base layer 2 may contain impurities other than the reactant of the base triazine-based silane coupling agent.

The base layer 2 has a function of suppressing diffusion of a metal element and formation of a metal oxide in the metal layer 4. The base layer 2 can be formed, for example, by forming a two-dimensional dense film by dehydration condensation of the base triazine-based silane coupling agent provided on the resin substrate 1. The base triazine-based silane coupling agent is represented by the following Formula (1). In the following Formula (1), $X^1$ and $X^2$ are any one of a 2-aminoethylamino group, an amino group, and an azide group, $X^1$ and $X^2$ may be the same or different, $R^1$, $R^2$, and $R^3$ represent a hydrogen atom or an alkoxy group, $R^1$, $R^2$, and $R^3$ may be the same or different, $R^4$ represents an alkylene group, and $R^5$ represents a hydrogen atom, an alkyl group, or an alkoxy group.

By using the base triazine-based silane coupling agent represented by the following Formula (1), the denseness of the film of the molecular bonding layer 3 provided on the base layer 2 is improved. In addition, a dense structure can be formed by using the base triazine-based silane coupling agent represented by the following Formula (1). This dense structure can prevent permeation of the metal element and oxygen into the metal layer 4 even in a high-temperature and high-humidity environment. As a result, it is possible to suppress a decrease in adhesion between the resin substrate 1 and the metal layer 4 in a high-temperature and high-humidity environment. The base layer 2 is preferably bonded to the resin substrate 1 via a chemical bond. By bonding via a chemical bond, high adhesion can be obtained even when the resin substrate 1 is smooth.

[Chemical Formula 3]

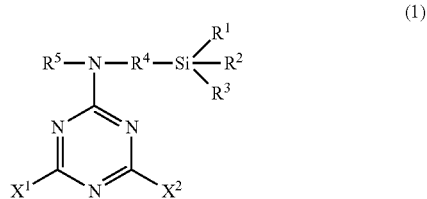

(1)

Examples of the alkoxy group of $R^1$, $R^2$, and $R^3$ in the above Formula (1) include a methoxy group, an ethoxy group, a propoxy group, an isopropoxy group, a butoxy group, and an isobutoxy group. The alkoxy group of $R^1$, $R^2$, and $R^3$ is preferably a methoxy group or an ethoxy group.

Examples of the alkylene group of $R^4$ in the above Formula (1) include a methylene group, an ethylene group, a propylene group, a butylene group, a pentylene group, a hexylene group, and a heptylene group. The alkylene group of $R^4$ in the above Formula (1) is preferably a propylene group.

Examples of the alkyl group of $R^5$ in the above Formula (1) include a methyl group, an ethyl group, a propyl group, and a butyl group.

Examples of the alkoxy group of $R^5$ in the above Formula (1) include a methoxy group, an ethoxy group, a propoxy group, an isopropoxy group, a butoxy group, and an isobutoxy group.

The thickness of the base layer 2 is not particularly limited as long as the thickness covers the entire surface of the resin substrate 1. The thickness of the base layer 2 may be, for example, equal to or more than the thickness of a single molecule of the base triazine-based silane coupling agent composing the base layer 2 (equal to or more than a molecular layer). When the thickness of the base layer 2 is more than 400 nm, cracking may occur at the time of bending, and the permeation preventing performance of the metal layer 4 against metal elements and oxygen may deteriorate. Therefore, the thickness of the base layer 2 is preferably 400 nm or less. A more preferable thickness of the base layer 2 is 200 nm or less.

(Molecular Bonding Layer)

The molecular bonding layer 3 is provided on the base layer 2. Here, "provided on the base layer 2" includes not only providing the molecular bonding layer 3 to be in contact with the surface of the base layer 2 but also providing an intermediate layer between the base layer 2 and the molecular bonding layer 3. By providing the molecular bonding layer 3, it becomes easy to support a catalyst to be a core of electroless plating. The molecular bonding layer 3 is made of an organosilicon compound having a triazine ring, and the triazine ring has a functional group having a function of supporting a catalyst. Examples of the functional group having a function of supporting a catalyst include a thiol group and a thiol metal salt. By having a function of supporting a catalyst, adhesion between the molecular bonding layer 3 and the metal layer 4 can be improved. The molecular bonding layer 3 may contain impurities other than the reactant of the triazine-based silane coupling agent.

The molecular bonding layer 3 contains a reactant of a catalytic triazine-based silane coupling agent represented by the following Formula (2). In the following Formula (2), $X^3$ and $X^4$ are a thiol group or a thiol metal salt, $X^3$ and $X^4$ may be the same or different, $R^6$, $R^7$, and $R^8$ represent a hydrogen atom or an alkoxy group, $R^6$, $R^7$, and $R^8$ may be the same or different, $R^9$ represents an alkylene group, and $R^{10}$ represents a hydrogen atom, an alkyl group, or an alkoxy group. By using the catalytic triazine-based silane coupling agent represented by the following Formula (2), the denseness of the molecular bonding layer 3 is improved, a catalyst for forming the metal layer 4 is easily supported. In addition, the adhesion to the base layer 2 is also improved by using the catalytic triazine-based silane coupling agent represented by the following Formula (2).

[Chemical Formula 4]

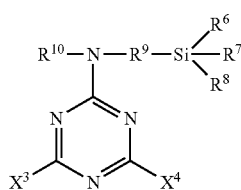

(2)

Examples of the alkoxy group of $R^6$, $R^7$, and $R^8$ in the above Formula (2) include a methoxy group, an ethoxy group, a propoxy group, an isopropoxy group, a butoxy group, and an isobutoxy group. The alkoxy group of $R^6$, $R^7$, and $R^8$ is preferably a methoxy group or an ethoxy group.

Examples of the alkylene group of $R^9$ in the above Formula (2) include a methylene group, an ethylene group, a propylene group, a butylene group, a pentylene group, a hexylene group, and a heptylene group. The alkylene group of $R^9$ in the above Formula (1) is preferably a propylene group.

Examples of the alkyl group of $R^{10}$ in the above Formula (1) include a methyl group, an ethyl group, a propyl group, and a butyl group.

Examples of the alkoxy group of $R^{10}$ in the above Formula (1) include a methoxy group, an ethoxy group, a propoxy group, an isopropoxy group, a butoxy group, and an isobutoxy group.

The thickness of the molecular bonding layer 3 is not particularly limited as long as the catalyst can be supported to such an extent that the metal layer 4 can be formed by electroless plating. The thickness of the molecular bonding layer 3 may be, for example, equal to or more than the thickness of a single molecule of the catalytic triazine-based silane coupling agent composing the molecular bonding layer 3 (equal to or more than a molecular layer). When the thickness of the molecular bonding layer 3 is more than 400 nm, cracking may occur at the time of bending, and the permeation preventing performance of the metal layer 4 against metal elements and oxygen may deteriorate. Therefore, the thickness of the molecular bonding layer 3 is preferably 400 nm or less. A more preferable thickness of the molecular bonding layer 3 is 200 nm or less.

(Metal Layer)

The metal layer 4 is provided on the molecular bonding layer 3. Here, "provided on the molecular bonding layer 3" includes not only providing the metal layer 4 to be in contact with the surface of the molecular bonding layer 3 but also providing an intermediate layer between the molecular bonding layer 3 and the metal layer 4. Examples of the material of the metal layer 4 include nickel, gold, silver, tin, copper, and a copper alloy. As the metal composing the metal layer 4, copper or a copper alloy having high conductivity is preferable from the viewpoint of power loss and transmission loss.

The thickness of the metal layer 4 is not particularly limited, and is, for example, 0.1 µm to 50 µm. More preferably, the thickness of the metal layer 4 is 2 µm to 10 µm. When the thickness of the metal layer 4 is 0.1 µm to 50 µm, sufficient conductivity and mechanical strength can be obtained.

(Peeling Strength)

The peeling strength between the resin substrate 1 and the metal layer 4 when the peeling strength between the resin substrate 1 and the metal layer 4 is measured at a tensile speed of 50 mm/min and a tensile angle of 90° after the laminate 100 is subjected to a HAST test (temperature: 130° C., humidity: 85% RH, 100 hours) is 0.32 kN/m or more. When the peeling strength between the resin substrate 1 and the metal layer 4 is 0.32 kN/m or more, the base layer 2 and the molecular bonding layer 3 preferably have a function of preventing permeation of water vapor. When the peeling strength between the resin substrate 1 and the metal layer 4 is measured in the same manner after the laminate 100 is heated at 260° C. for 5 minutes, the peeling strength is preferably 0.50 kN/m or more because the base layer 2 and the molecular bonding layer 3 have a function of preventing permeation of oxygen and the metal element in the metal layer 4.

The laminate 100 according to the present embodiment has been described above. The laminate 100 according to the present embodiment does not include an intermediate layer between the resin substrate 1 and the base layer 2, but may include an intermediate layer between the resin substrate 1 and the base layer 2. The laminate 100 according to the present embodiment does not include an intermediate layer between the base layer 2 and the molecular bonding layer 3, but may include a second intermediate layer between the base layer 21 and the molecular bonding layer 3.

<Method for Manufacturing Laminate>

Figure 2:
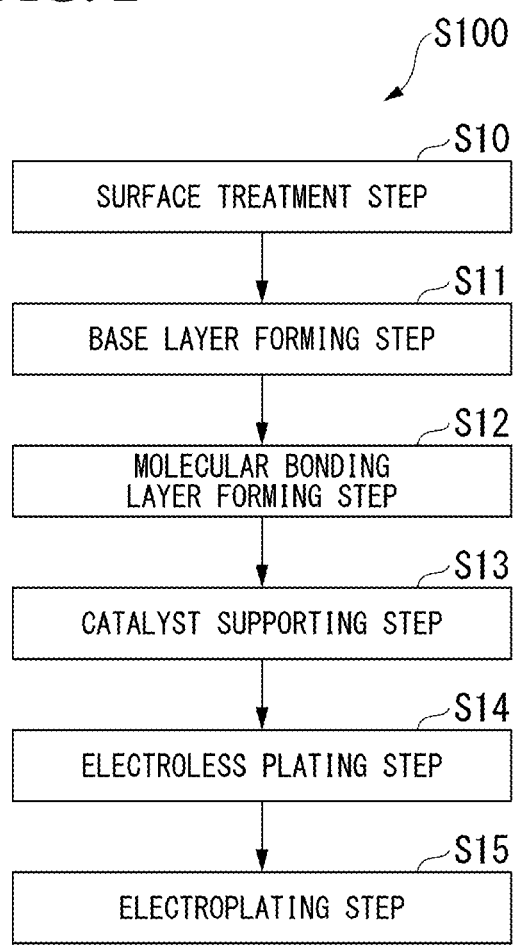
FIG. 2 is a flowchart of a method for manufacturing a laminate according to the embodiment of the present invention.

Next, a method for manufacturing a laminate according to the present embodiment will be described. As shown in FIG. 2, a method S100 for manufacturing a laminate according to the present embodiment is a method for manufacturing the laminate 100 including the resin substrate 1 and the metal layer 4 provided on the resin substrate 1, the method including: a surface treatment step S10 of introducing an oxygen-containing functional group or a nitrogen-containing functional group into the resin substrate 1; a base layer forming step S11 of forming a base layer with the base triazine-based silane coupling agent directly or via another layer on a surface of the resin substrate 1 on which the metal layer 4 is formed; a molecular bonding layer forming step S12 of forming the molecular bonding layer 3 with a catalytic triazine-based silane coupling agent on a surface of the base layer 2; a catalyst supporting step S13 of supporting a catalyst on a surface of the molecular bonding layer 3; an electroless plating step S14 of forming the metal layer 4 on the surface of the molecular bonding layer 3 supporting the catalyst by electroless plating, and an electroplating step S15 of thickening the metal layer 4 by performing electroplating on the metal layer 4 formed in the electroless plating step S14. Here, the "metal layer 4 provided on the resin substrate 1" does not mean the metal layer is provided directly on the resin substrate 1 in the manufacturing method of the present embodiment, but means the metal layer 4 is provided above the resin substrate 1. That is, it means a method for manufacturing a laminate including the base layer 2 and the molecular bonding layer 3 between the resin substrate 1 and the metal layer 4.

(Surface Treatment Step)

In the surface treatment step S10, an oxygen-containing functional group or a nitrogen-containing functional group is introduced into the surface (surface on which the metal layer 4 is formed) of the resin substrate 1. Thus, the base layer can be easily formed with the base triazine-based silane coupling agent. The method is not particularly limited as long as the oxygen-containing functional group or the nitrogen-containing functional group can be introduced into the surface of the resin substrate 1 in the surface treatment step S10. Examples of the oxygen-containing functional group include a hydroxyl group, a carbonyl group, and a carboxyl group. Examples of the nitrogen-containing functional group include an amino group and the like. The hydroxyl group or amino group is preferable because the hydroxyl group or amino group forms a chemical bond with the base triazine-based silane coupling agent, and high adhesion is obtained between the resin substrate 1 and the metal layer 4. The surface treatment step S10 preferably includes a hydroxyl group modifying step of introducing a hydroxyl group as an oxygen-containing functional group or an amino group modifying step of introducing an amino group as a nitrogen-containing functional group. Here, a hydroxyl group modifying step of introducing a hydroxyl group to the surface of the resin substrate 1 will be described as an example.

The hydroxyl group modifying step is, for example, a corona discharge treatment or a plasma treatment. A hydroxyl group can be introduced to the surface of the resin substrate 1 by subjecting the resin substrate 1 to a corona treatment or a plasma treatment. The amount of hydroxyl groups modified on the surface of the resin substrate 1 can be adjusted by treatment time, voltage, and the like. The gas used for the plasma treatment is not particularly limited, and examples thereof include $O_2$ and the like. The oxygen gas introduction plasma is plasma using $O_2$ gas. When $NH_3$ is used in the plasma treatment, an amino group is introduced (ammonia gas introduction plasma). In this case, an amino group modifying step is performed.

(Base Layer Forming Step)

In the base layer forming step S11, the base layer 2 is formed on the surface of the resin substrate 1 on which the metal layer 4 is formed, which has been treated in the surface treatment step S10, with a base triazine-based silane coupling agent directly or via another layer. The silane coupling agent for forming the base layer 2 is a base triazine-based silane coupling agent represented by the above Formula (1).

Specific examples of the base triazine-based silane coupling agent represented by the above Formula (1) include N,N'-bis(2-aminoethyl)-6-(3-triethoxysilylpropyl)amino-1,3,5-triazine-2,4-diamine (hereinafter may be referred to as aTES) represented by Formula (3) and 6-(3-triethoxysilylpropylamino)-1,3,5-triazine-2,4-diazide (hereinafter may be referred to as pTES) represented by Formula (4).

[Chemical Formula 5]

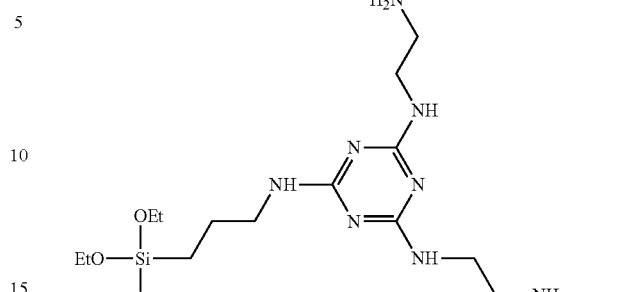

(3)

[Chemical Formula 6]

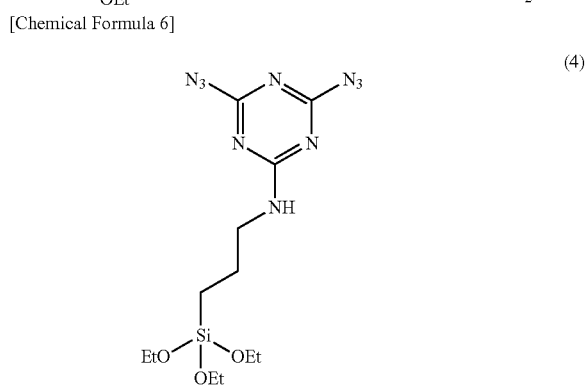

(4)

The method for forming a layer on the surface of the resin substrate 1 modified with an oxygen-containing functional group with a base triazine-based silane coupling agent is not particularly limited. For example, a solution (base triazine-based silane coupling agent solution) in which a base triazine-based silane coupling agent is dissolved may be applied to the resin substrate 1, or the resin substrate 1 may be immersed in the base triazine-based silane coupling agent solution. When the base layer 2 is formed at a molecular layer level, it is preferable to form the base layer 2 by immersing the resin substrate 1 in a base triazine-based silane coupling agent solution.

When immersed in the base triazine-based silane coupling agent solution, the concentration of the base triazine-based silane coupling agent is not particularly limited, and is, for example, 0.001% by weight to 10% by weight. The immersion time is, for example, 1 second to 60 minutes, and the immersion temperature is, for example, in the range of room temperature to 60° C.

The solvent used in the base triazine-based silane coupling agent solution is not particularly limited as long as the base triazine-based silane coupling agent is uniformly dissolved in the solvent. Examples of the solvent of the base triazine-based silane coupling agent solution include water, ethanol, methanol, isopropanol, hexanone, hexane, and acetone.

(Molecular Bonding Layer Forming Step)

In the molecular bonding layer forming step S12, the molecular bonding layer 3 is formed on the surface of the base layer 2 with a catalytic triazine-based silane coupling agent. By forming the molecular bonding layer 3, the catalyst supporting ability of the resin substrate 1 is improved. The silane coupling agent is a catalytic triazine-based silane coupling agent represented by the above Formula (2).

Specific examples of the catalytic triazine-based silane coupling agent represented by the above Formula (2) include (6-(3-triethoxysilylpropylamino)-1,3,5-triazine-2,4-dithiol monosodium salt (hereinafter may be referred to as nTES) represented by the following Formula (5).

The method for forming the molecular bonding layer 3 with the catalytic triazine-based silane coupling agent is not particularly limited. For example, a solution (hereinafter may be referred to as a catalytic triazine-based silane coupling agent solution) in which the catalytic triazine-based silane coupling agent is dissolved may be applied to the resin substrate 1 on which the base layer 2 is formed, or the resin substrate 1 on which the base layer 2 is formed may be immersed in the catalytic triazine-based silane coupling agent solution. When the molecular bonding layer 3 is formed at a molecular layer level, it is preferable to form the molecular bonding layer 3 by immersing the resin substrate 1 on which the base layer 2 is formed in a catalytic triazine-based silane coupling agent solution.

[Chemical Formula 7]

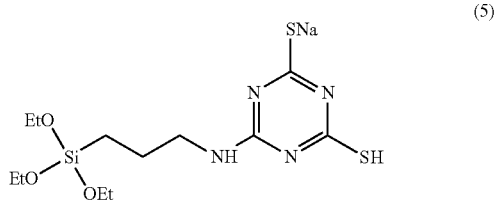

(5)

When immersed in the catalytic triazine-based silane coupling agent solution, the concentration of the catalytic triazine-based silane coupling agent is not particularly limited, and is, for example, 0.001% by weight to 2% by weight. The immersion time is, for example, 1 second to 60 minutes, and the immersion temperature is, for example, in the range of room temperature to 60° C.

The solvent used in the catalytic triazine-based silane coupling agent solution is not particularly limited as long as the catalytic triazine-based silane coupling agent is uniformly dissolved in the solvent. Examples of the solvent of the catalytic triazine-based silane coupling agent solution include water, ethanol, and methanol.

(Catalyst Supporting Step)

In the catalyst supporting step 13, a catalyst is supported on the surface of the molecular bonding layer 3. The method for supporting the catalyst is not particularly limited. As a method for supporting the catalyst, for example, there is a method of immersing the resin substrate 1 on which the molecular bonding layer 3 is formed in an aqueous solution composed of a palladium salt, tin chloride or the like. By immersing the resin substrate 1 on which the molecular bonding layer 3 is formed, the catalyst is supported on the thiol group and the like contained in the catalytic triazine-based silane coupling agent.

Usually, a Pd—Sn-based catalyst is used in the activation step, and this activation bath is adjusted, for example, by dissolving $PdCl_2$ and $SnCl_2 \cdot 7H_2O$ in water. $PdCl_2$ and $SnCl_2 \cdot 7H_2O$ are each prepared in a concentration range of 0.001 to 1 mol/L and used in a temperature range of 0 to 70° C. with an immersion time of 1 second to 60 minutes.

(Electroless Plating Step)

In the electroless plating step S14, the metal layer 4 is formed on the surface of the molecular bonding layer 3 supporting the catalyst by electroless plating. Specifically, the metal layer 4 is formed on the molecular bonding layer 3 by immersing the resin substrate 1 supporting the catalyst in an electroless plating bath. Here, the electroless plating bath is mainly composed of a metal salt and a reducing agent, to which auxiliary components such as a pH adjusting agent, a buffering agent, a complexing agent, an accelerator, a stabilizer, and an improver are added. Since the supported catalyst and the triazine-based silane coupling agent are bonded by an ionic bond, the adhesive strength is improved.

In the case of copper, the metal salt is, for example, $CuSO_4 \cdot 5H_2O$. The metal salt concentration is 0.001 mol/L to 1 mol/L. In the case of Ni, the metal salt is, for example, $NiSO_4 \cdot 6H_2O$ (nickel sulfate) or $NiCl_2$ (nickel chloride). In the case of Ag, the metal salt is, for example, AgCN (silver cyanide). In the case of Sn, the metal salt is, for example, $SnSO_4$ (stannous sulfate). In the case of gold, the metal salt is, for example, $K[Au(CN)_2]$ (gold(1) potassium cyanide).

The reducing agent has an action of reducing the above-mentioned metal salt to produce a metal, and examples thereof include $KBH_4$, $NaBH_4$, $NaH_2PO_2$, $(CH_3)_2NH \cdot BH_3$, $CH_2O$, $NH_2NH_2$, hydroxylamine salts, and N,N-ethylglycine and the like 22222. The concentration of the reducing agent is 0.001 to 1 mol/L.

For the purpose of increasing the reduction efficiency of the electroless plating bath, for example, a basic compound, an inorganic salt, an organic acid salt, a citrate, an acetate, a borate, a carbonate, ammonia hydroxide, EDTA, diaminoethylene, sodium tartrate, ethylene glycol, thiourea, triazinethiol, triethanolamine, or the like may be added to the electroless plating bath.

The temperature of the electroless plating bath is, for example, in a temperature range of 0° C. to 98° C., and the immersion time is, for example, an immersion time of 1 minute to 300 minutes.

(Electroplating Step)

In the electroplating step S15, electroplating is performed on the metal layer 4 formed in the electroless plating step S14 to thicken the metal layer 4. The electroplating can be performed by a known method.

The method S100 for manufacturing a laminate according to the present embodiment has been described above. The method S100 for manufacturing a laminate according to the present embodiment includes the surface treatment step S10, but the surface treatment step S10 may be omitted when the base layer 2 is easily formed on the surface of the resin substrate 1 (the surface on which the metal layer 4 is formed) with the base triazine-based silane coupling agent. In addition, when a base triazine-based silane coupling agent having a photoreactive functional group such as 6-(3-triethoxysilylpropylamino)-1,3,5-triazine-2,4-diazide is used as the base triazine-based silane coupling agent, a light irradiation step may be further included after the base layer forming step. The base triazine-based silane coupling agent including an azide group is irradiated with light (for example, ultraviolet light) to generate a nitrene from the azide group, the generated nitrene reacts with the surface of the resin substrate 1, and accordingly, high adhesion can be obtained. In the method for manufacturing a laminate of the present embodiment, a metal vapor deposition step of forming a metal layer by vacuum deposition or the like may be performed instead of the catalyst supporting step, the electroless plating step, and the electroplating step.

EXAMPLES

Next, Examples of the present invention will be described, but the conditions in Examples are one condition example adopted to confirm the operability and effects of the present invention, and the present invention is not limited to this one condition example. The present invention can adopt various conditions as long as the object of the present invention is achieved without departing from the gist of the present invention.

Solution

Each solution used for preparing Examples and Comparative Examples was prepared by the following method.

"3% by Weight APTES Solution"

While 97 mL of distilled water was stirred with ultrasonic waves for 10 minutes, 3 g of 3-aminopropyl triethoxysilane (APTES) manufactured by Tokyo Chemical Industry Co., Ltd. was added to prepare a 3% by weight APTES solution.

"0.5% by Weight aTES Solution"

0.5 g of N,N'-bis(2-aminoethyl)-6-(3-triethoxysilylpropyl)amino-1,3,5-triazine-2,4-diamine (aTES) manufactured by Sulfur Chemical Laboratory Inc. was added to 99.5 mL of distilled water under ultrasonic stirring for 10 minutes to prepare a 0.5% by weight aTES solution.

"0.1% by Weight nTES Solution"

0.1 g of 6-(3-triethoxysilylpropylamino)-1,3,5-triazine-2,4-dithiol monosodium salt (nTES) manufactured by Sulfur Chemical Laboratory Inc. was added to 99.9 mL of distilled water under ultrasonic stirring for 10 minutes to prepare a 0.1% by weight nTES solution.

"Pre-Dip Solution"

While performing ultrasonic stirring for 10 minutes to 50 mL of distilled water, 12.5 g of CATAPREP 404 made of Rohm and Haas Electronic Materials was added to prepare a pre-dip solution.

"Catalyst Solution"

While performing ultrasonic stirring for 10 minutes to 50 mL of distilled water, 12.5 g of CATAPREP 404 made of Rohm and Haas Electronic Materials was added. After the CATAPREP 404 was completely dissolved, 1.5 ml of CATAPOSIT 44 made of a Rohm and Haas Electronic Materials was added to prepare a catalyst solution.

"Accelerator Solution"

While performing ultrasonic stirring for 10 minutes to 47.5 mL of distilled water, 2.5 g of an accelerator –19E manufactured by Rohm and Haas Electronic Materials was added to prepare an accelerator solution.

"Electroless Plating Solution"

An electroless plating solution was prepared by adding 2.5 mL of ADCOPPER IW-A manufactured by Okuno Pharmaceutical Industry Co., Ltd., 0.75 mL of ADCOPPER C manufactured by Okuno Pharmaceutical Industry Co., Ltd., 4 mL of ADCOPPER manufactured by Okuno Pharmaceutical Industry Co., Ltd., and 0.15 mL of electroless copper R—N manufactured by Okuno Pharmaceutical Industry Co., Ltd. to 42.6 mL of distilled water while performing ultrasonic stirring for 10 minutes.

(Resin Substrate)

As a polyimide base material, a polyimide base material manufactured by KOYO Corporation, 50 mm×30 mm×130 µm in thickness was used. As the LCP film, an LCP film (30 mm×60 mm×50 µm in thickness) manufactured by Kuraray Co., Ltd. was used.

(Plasma Treatment)

The resin substrate was immersed in ethanol, irradiated with ultrasonic waves for 10 minutes, and the resin substrate was washed and dried. The surface of the dried resin substrate was subjected to a plasma treatment using a plasma treatment apparatus (plasma etcher manufactured by SAKIGAKE-Semiconductor Co., Ltd., applied power: 100 W). The time described in the column of pretreatment in Table 1 means the treatment time of plasma treatment. $O_2$ described in the column of pretreatment means a gas used for plasma treatment.

(Immersion Conditions)

After pretreating the resin substrate under the conditions described in Table 1, the resin substrate was immersed in the aTES solution or APTES solution having the concentration described in Table 1 for 1 minute, and dried to form a base layer. When it is written NO in the column of pretreatment, the resin substrate was immersed in the aTES solution or the APTES solution without being pretreated. Thereafter, the resin substrate on which the base layer was formed was washed with water and dried. When the concentration is described in the column of nTES in Table 1, the resin substrate on which the base layer was formed was immersed in a 0.1% by weight nTES solution for 5 minutes, and then washed with distilled water. Note that * in the columns of aTES and nTES indicates a mixed liquid of aTES and nTES. In Experiment No. 5, a 0.5% by weight aTES solution and a 0.1% by weight nTES solution were mixed, and the resin substrate was immersed in the mixed liquid for 5 minutes. The mixed liquid of Experiment No. 5 was suspended in a colloidal state.

(Metal Layer Forming Conditions)

After washing, the resin substrates of Experiments No. 1 to 5 were immersed in the pre-dip solution for 1 minute, immersed in the catalyst solution at 50° C. for 1 minute without washing after immersion, and then washed with distilled water. Thereafter, the resin substrate was immersed in the accelerator solution for 3 minutes without being dried, and washed with distilled water. After washing, the resin substrate in a wet state was immersed in an electroless copper plating solution at 32° C. for 5 minutes, washed with distilled water and ethanol, and dried. After drying, the resin substrate (laminate) on which the copper layer was formed was annealed at 80° C. for 10 minutes. After annealing, the resin substrate was cooled to room temperature. After cooling, the laminate after annealing was immersed in a copper sulfate-based electric copper plating solution, copper plating was performed at a voltage of 15 V and a current density of 0.02 A/cm$^2$ for 90 minutes, washing and drying were performed with distilled water, and annealing was performed at 80° C. for 10 minutes to obtain laminates of Experiments No. 1 to 5. In Experiments No. 2 and 4, a base treatment step and a molecular bonding layer forming treatment step were performed.

(Measurement of Plating Initial Peeling Strength)

A cut with a width of 1 cm was made in the copper layer part of each of the laminates of Experiments No. 1 to 5, and the peeling strength (plating initial peeling strength) between the copper layer and the resin substrate was measured under the conditions of a tensile speed of 50 mm/min and a tensile angle of 900 using an adhesion tester (IMADA FORCE MEASUREMENT model mX2 manufactured by IMADA CO., LTD.). When the initial peeling strength was 0.40 kN/m or more, there was no practical problem, and therefore the initial peeling strength of 0.40 kN/m or more was regarded as acceptable. The obtained results are shown in Table 1.

(Measurement of Peeling Strength after HAST)

The laminates of Experiments No. 1 to 5 were placed in a thermo-hygrostat at 130° C. and a humidity of 85%, and held for 100 hours to perform a high-speed accelerated life treatment test (HAST). A cut with a width of 1 cm was made in the copper layer part of the laminate after the high-speed accelerated life test, and the peeling strength (peeling strength after HAST) between the copper layer and the resin substrate was measured under the conditions of a tensile speed of 50 mm/min and a tensile angle of 90° using an adhesion tester (IMADA FORCE MEASUREMENT model mX2 manufactured by IMADA CO., LTD.). The obtained results are shown in Table 1. Since there was no practical problem when the peeling strength after the HAST test was 0.32 kN/m or more, the peeling strength after the HAST test of 0.32 kN/m or more was regarded as acceptable. The obtained results are shown in Table 1. Regarding Experiment No. 5, since it was determined that the mixed liquid of aTES and nTES was colloidal and suspended to form a coarse precipitate, the HAST evaluation test was not performed.

(Measurement of Peeling Strength after Heat Resistance)

The laminates of Experiments No. 1 to 5 were subjected to a heat treatment at 260° C. for 5 minutes. A cut with a width of 1 cm was made in the copper layer part of the laminates after heat treatment, and the peeling strength (peeling strength after heat resistance) between the copper layer and the resin substrate was measured under the conditions of a tensile speed of 50 mm/min and a tensile angle of 90° using an adhesion tester (IMADA FORCE MEASUREMENT model mX2 manufactured by IMADA CO., LTD.). A peeling strength of 0.40 kN/m or more was regarded as acceptable. The obtained results are shown in Table 1.

TABLE 1

| Experiment No. | Substrate material | Pretreatment | aTES (wt %) | APTES (wt %) | nTES (wt %) | Plating initial peeling strength (kN/m) | Peeling strength after HAST (kN/m) | Peeling strength after heat resistance (kN/m) | Remark |
|---|---|---|---|---|---|---|---|---|---|
| 1 | PI | NO | — | 3 | 0.1 | 0.64 | 0.19 | 0.19 | Comparative example |
| 2 | PI | NO | 0.5 | — | 0.1 | 0.89 | 0.44 | 0.56 | Example |
| 3 | LCP film | RF plasma $O_2$ 10 min | 0.5 | — | — | 0.51 | 0.26 | 0.74 | Comparative example |
| 4 | LCP film | RF plasma $O_2$ 10 min | 0.5 | — | 0.1 | 0.59 | 0.36 | 0.61 | Example |
| 5 | Comparative PI | NO | * | — | * | 0.60 | — | 0.26 | Comparative example |

In the laminates of Experiments No. 2 and No. 4, since the base layer and the molecular bonding layer were formed, the initial peeling strength was 0.40 kN/m or more, the peeling strength after the HAST test was 0.32 kN/m or more, and the peeling strength after the heat treatment at 260° C. for 5 minutes was 0.40 kN/m or more. Therefore, the laminates of Experiments No. 2 and 4 were excellent in heat resistance.

INDUSTRIAL APPLICABILITY

According to the present invention, the surface of the metal layer on the side in contact with the resin is smooth, the adhesion between the metal layer and the resin in a high-temperature and high-humidity environment is excellent, the cost is low, and thus the industrial applicability is high.

REFERENCE SIGNS LIST

1 Resin substrate
2 Base layer
3 Molecular bonding layer
4 Metal layer
100 Laminate

What is claimed is:

1. A method for manufacturing a laminate, including a resin substrate, and a metal layer provided on the resin substrate, the method comprising:

a base layer forming step of forming a base layer with a base triazine-based silane coupling agent which is represented by the following Formula (1) directly or via another layer, on a surface of the resin substrate on which the metal layer is formed; and a molecular bonding layer forming step of forming a molecular bonding layer with a catalytic triazine-based silane coupling agent represented by the following Formula (2), on a surface of the base layer, wherein an arithmetic average roughness Ra of the resin substrate is 0.01 μm to 0.2 μm,

[Chemical Formula 1]

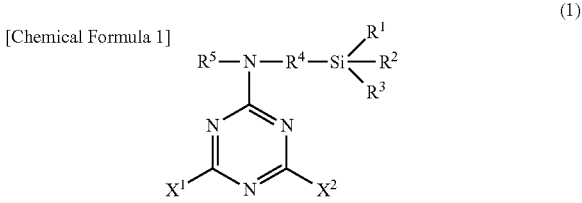

(1)

-continued

[Chemical Formula 2]

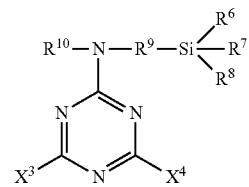

(2)

in Formula (1), $X^1$ and $X^2$ are a 2-aminoethylamino group or an amino group, $X^1$ and $X^2$ are the same or different, $R^1$, $R^2$, and $R^3$ represent a hydrogen atom or an alkoxy group, $R^1$, $R^2$, and $R^3$ are the same or different, $R^4$ represents an alkylene group, and $R^5$ represents a hydrogen atom, an alkyl group, or an alkoxy group, and in Formula (2), $X^3$ and $X^4$ are a thiol group or a thiol metal salt, $X^3$ and $X^4$ are the same or different, $R^6$, $R^7$, and $R^8$ represent a hydrogen atom or an alkoxy group, $R^6$, $R^7$, and $R^8$ are the same or different, $R^9$ represents an alkylene group, and $R^{10}$ represents a hydrogen atom, an alkyl group, or an alkoxy group.

2. The method for manufacturing a laminate according to claim 1, wherein in the molecular bonding layer forming step, a thickness of the molecular bonding layer is equal to or more than the thickness of a single molecule of the catalytic triazine-based silane coupling agent composing the molecular bonding layer and 400 nm or less.

3. The method for manufacturing a laminate according to claim 1, further comprising: a surface treatment step of introducing an oxygen-containing functional group or a nitrogen-containing functional group into the surface of the resin substrate.

4. The method for manufacturing a laminate according to claim 3, wherein the surface treatment step includes a hydroxyl group modifying step of introducing a hydroxyl group as an oxygen-containing functional group into the surface of the resin substrate.

5. The method for manufacturing a laminate according to claim 4, wherein the hydroxyl group modifying step is a corona treatment or oxygen gas introduction plasma.

6. The method for manufacturing a laminate according to claim 3, wherein the surface treatment step includes an amino group modifying step of introducing an amino group as the nitrogen-containing functional group into the surface of the resin substrate.

7. The method for manufacturing a laminate according to claim 6, wherein the amino group modifying step is a plasma treatment.

8. The method for manufacturing a laminate according to claim 1, wherein a resin comprising the resin substrate is one selected from the group consisting of an epoxy resin, a polyimide resin, polyphenylenesulfide, polytetrafluoroethylene, silicon rubber, a cyclic olefin copolymer, polystyrene, and a liquid crystal polymer.

9. The method for manufacturing a laminate according to claim 1, further comprising: a catalyst supporting step of supporting a catalyst on a surface of the molecular bonding layer.

10. The method for manufacturing a laminate according to claim 9, further comprising: an electroless plating step of providing the metal layer on a surface of the molecular bonding layer supporting the catalyst by electroless plating.

11. The method for manufacturing a laminate according to claim 10, further comprising: an electroplating step of thickening the metal layer by performing electroplating on the metal layer formed in the electroless plating step.

\* \* \* \* \*